(12) United States Patent
Cabezas et al.

(10) Patent No.: US 8,347,142 B2
(45) Date of Patent: Jan. 1, 2013

(54) NON-DISRUPTIVE I/O ADAPTER DIAGNOSTIC TESTING

(75) Inventors: Rafael G. Cabezas, Austin, TX (US); David D. Galvin, Austin, TX (US); Binh K. Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/050,372

(22) Filed: Mar. 17, 2011

(65) Prior Publication Data

US 2011/0167293 A1 Jul. 7, 2011

Related U.S. Application Data

(63) Continuation of application No. 12/031,417, filed on Feb. 14, 2008, now Pat. No. 8,006,133.

(51) Int. Cl.
*G06F 11/00* (2006.01)

(52) U.S. Cl. .......................................... 714/25
(58) Field of Classification Search ..................... 714/25
See application file for complete search history.

(56) References Cited

U.S. PATENT DOCUMENTS

| | | | |
|---|---|---|---|
| 5,734,818 A | 3/1998 | Kern et al. | |
| 5,852,724 A | 12/1998 | Glenn et al. | |
| 5,937,428 A | 8/1999 | Jantz | |
| 6,675,258 B1 | 1/2004 | Bramhall et al. | |
| 7,228,538 B1 | 6/2007 | Burton et al. | |
| 7,246,255 B1 | 7/2007 | Heideman et al. | |
| 7,350,046 B2 * | 3/2008 | Sicola et al. | 711/170 |
| 7,444,541 B2 | 10/2008 | Lubbers et al. | |
| 7,685,461 B2 | 3/2010 | Brundidge et al. | |
| 2002/0116660 A1 | 8/2002 | Duchesne et al. | |
| 2002/0133735 A1 | 9/2002 | McKean et al. | |
| 2008/0228959 A1 | 9/2008 | Wang | |
| 2009/0210751 A1 | 8/2009 | Cabezas et al. | |

OTHER PUBLICATIONS

Bonzo, B.—Non-final Office Action, U.S. Appl. No. 12/031,417, dated Aug. 30, 2010.
Bonzo, B.—Final Office Action, U.S. Appl. No. 12/031,417, dated Feb. 2, 2011.

\* cited by examiner

*Primary Examiner* — Bryce Bonzo
(74) *Attorney, Agent, or Firm* — Yudell Isidore Ng Russell PLLC

(57) ABSTRACT

A primary I/O adapter and a redundant I/O adapter of a data processing system are assigned to support access to a system resource. While the primary I/O adapter is in service and the redundant I/O adapter is not in service in providing access to the system resource, a fail over command is issued to remove the primary I/O adapter from service and place the redundant I/O adapter in service in supporting access to the system resource. While the redundant I/O adapter is in service and the primary I/O adapter is not in service in providing access to the system resource, diagnostic testing on the primary I/O adapter is performed. In response to the diagnostic testing revealing no fault in the primary I/O adapter, a fail back command is issued to restore the primary I/O adapter to service and to remove the redundant I/O adapter from service.

6 Claims, 4 Drawing Sheets

NON-DISRUPTIVE I/O ADAPTER DIAGNOSTIC TESTING

PRIORITY CLAIM

This application is a continuation of U.S. patent application Ser. No. 12/031,417, which was filed Feb. 14, 2008, and incorporated herein by reference in its entirety.

BACKGROUND OF THE INVENTION

1. Technical Field

The present invention is relates in general to data processing and more particularly to diagnostic testing of input/output (I/O) adapters of data processing systems.

2. Description of the Related Art

A typical client/server network includes one or more servers responding to requests of one or more clients. As broadly used in this context, a server is generally considered to be a collection of software, firmware and/or hardware or any combination of the foregoing that provide services to clients. Similarly, the term client is considered to be a collection of hardware, firmware and/or software or any combination of the foregoing that requests services from one or more servers. In accomplishing its primary function of providing services to its client(s), a server may function as a client of one or more other servers.

Servers connect to and communicate with resources, such as networks, data storage and peripheral devices, utilizing hardware devices known as input/output (I/O) adapters. Errors in or failure of I/O adapters can render the resources accessed via the I/O adapters unavailable to not only the server, but also the clients of the server. In many computing environments, such interruption of service is highly costly or unacceptable. Consequently, in order to promote reliability, correct errors and reduce the frequency of unexpected hardware failures, administrators of computer systems, such as high-end servers, frequently perform diagnostic testing on installed hardware, including I/O adapters.

With current diagnostic methods, the system administrator changes the state of an I/O adapter from a normal operating mode to a diagnostic mode in order to perform one or more diagnostic routines. Unfortunately, such diagnostic testing renders the associated resources unavailable to the server's clients, and if the I/O adapter is a network adapter, may render the entire server and all of its associated resources unavailable to the server's clients. If the I/O adapter undergoing diagnostic testing is a storage adapter, the system administrator may be required to shutdown the server entirely in order to perform the testing.

Because of the loss of service(s) attendant to diagnostic testing, system owners can be reluctant to schedule diagnostic testing. Moreover, because diagnostic testing does not always capture all of the real time hardware bugs present within the system, I/O adapters are often replaced even if the diagnostic testing certifies that the I/O adapters are working properly to reduce further system downtime.

SUMMARY OF THE INVENTION

A primary I/O adapter and a redundant I/O adapter of a data processing system are assigned to support access to a system resource. While the primary I/O adapter is in service and the redundant I/O adapter is not in service in providing access to the system resource, a fail over command is issued to remove the primary I/O adapter from service and place the redundant I/O adapter in service in supporting access to the system resource. While the redundant I/O adapter is in service and the primary I/O adapter is not in service in providing access to the system resource, diagnostic testing on the primary I/O adapter is performed. In response to the diagnostic testing revealing no fault in the primary I/O adapter, a fail back command is issued to restore the primary I/O adapter to service and to remove the redundant I/O adapter from service.

DETAILED DESCRIPTION OF ILLUSTRATIVE EMBODIMENT(S)

Figure 1:
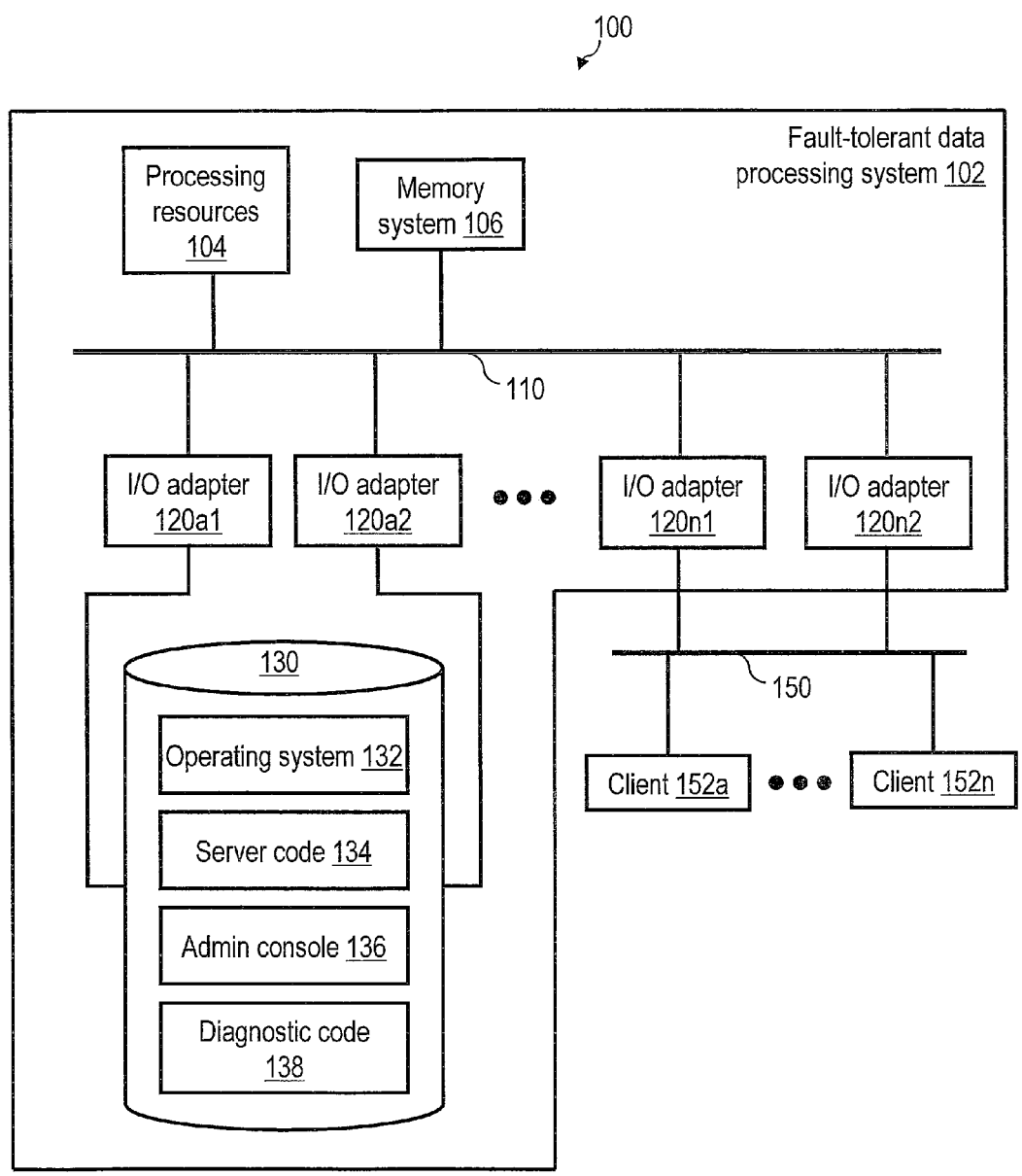
FIG. 1 illustrates an exemplary embodiment of a data processing environment within which embodiments of the invention may be practiced.

With reference now to the figures and in particular with reference to FIG. 1, there is illustrated a high level block diagram of a data processing environment 100 within which embodiments of the present invention may be practiced. Data processing environment 100 includes a fault-tolerant data processing system 102 containing processing resources 104 and a memory system 106, each coupled to a system interconnect 110, which can include one or more switches, buses, networks or hybrid interconnects.

Various resources of fault-tolerant data processing system 102 are coupled to system interconnect 110 by multiple I/O adapters. For example, at least I/O adapters 120n1 and 120n2 couple system interconnect 110 with an external network 150 to which one or more clients 152a-152n are attached to access services of fault-tolerant data processing system 102. Thus, I/O adapters 120n1-120n2 support client/server communication by communicating messages between various components of fault-tolerant data processing system 102 and clients 152a-152n. Fault-tolerant data processing system 102 further includes at least I/O adapters 120a1 and 120a2, which couple system interconnect 110 with a storage system 130 comprising one or more logical and/or physical storage devices.

With the illustrated arrangement in which at least one resource is coupled to fault-tolerant data processing system 102 by multiple I/O adapters 120, many different adapter utilization schemes are possible. In at least some embodiments, at least one I/O adapter 120 coupled to each resource is designated as a "primary" I/O adapter and is utilized to communicate messages during normal system operation. At least one additional I/O adapter 120 coupled to the same resource is designated as a standby or redundant I/O adapter 120, and is accordingly employed in response to failure of the primary I/O adapter 120 or during diagnostic testing of the primary I/O adapter 120. For simplicity, it will hereafter be assumed that I/O adapter 120a1 is the primary I/O adapter 120 coupled to storage system 130, I/O adapter 120a2 is the redundant I/O adapter for storage system 130, I/O adapter 120n1 is the primary I/O adapter 120 coupled to network 150, and I/O adapter 120n2 is the redundant I/O adapter for network 150.

Still referring to FIG. 1, storage system 130 provides storage for various program code executable by processing resources 104. For example, in the depicted embodiment, storage system 130 provides storage for an operating system 132 of fault-tolerant data processing system 102, server code 134 that provides services to clients 152a-152n, an administrator console 136 that may be utilized by a human or automated system administrator to control operation of fault-tolerant data processing system 102, and diagnostic code 138 that performs diagnostic testing on I/O adapters 120 as discussed further below. In at least some embodiments, operating system 132 operates at least I/O adapters 120 (and optionally additional components) of fault-tolerant data processing system 102 in a fault-tolerant mode of operation in which the states of the primary I/O adapters 120 are recorded at regular intervals or checkpoints (e.g., in memory system 106); thus, if a primary I/O adapter 120 develops a failure, the last valid state can be transferred to the associated redundant I/O adapter 120, and processing can continue utilizing the redundant I/O adapter 120.

Figure 2:
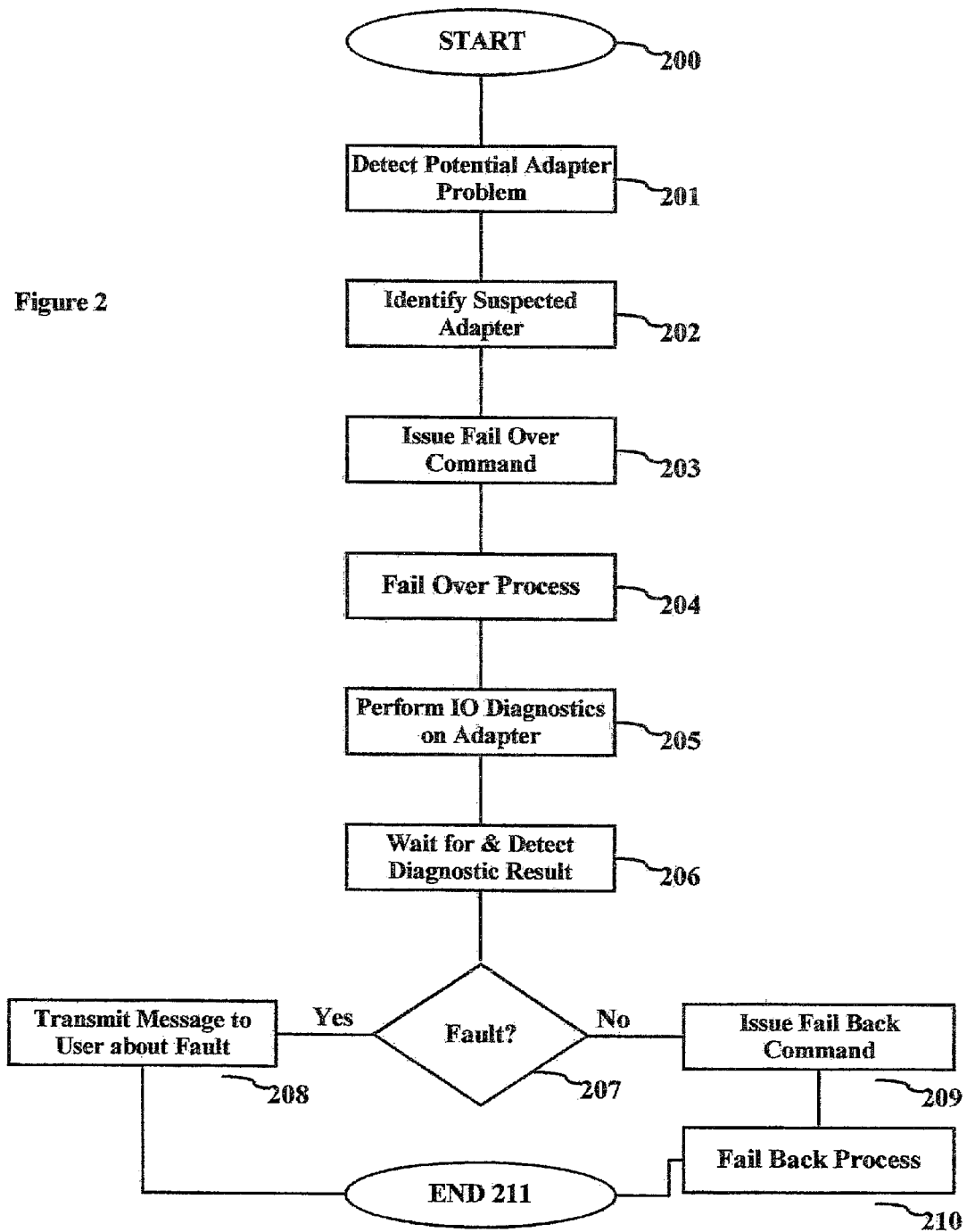
FIG. 2 is a high level logical flowchart of an exemplary non-disruptive diagnostic process for the data processing system of FIG. 1.

Referring now to FIG. 2, there is depicted a high level logical flowchart of an exemplary non-disruptive diagnostics process for fault-tolerant data processing system 102 of FIG. 1. In various embodiments, the depicted process can be performed in a completely automated fashion by software (e.g., operating system 132 and diagnostic code 138), can be performed under system administrator control via administrator console 136, or can be performed utilizing a combination of system administrator control and automation.

The illustrated process begins at block 200. At this point, fault-tolerant data processing system 102 provides access to a system resource such as network 150 or storage system 130 utilizing a primary I/O adapter 120 as previously described. A redundant I/O adapter 120 also allocated to support access to the system resource is installed, but is not in-service in supporting access to the system resource. The process then proceeds to block 201, which depicts operating system 132 detecting a potential failure of a primary I/O adapter 120, such as I/O adapter 120a1 or I/O adapter 120n1. The detection may entail, for example, receipt of an interrupt, a message timeout, failure of an error checking code, or simply elapsing of an interval since a last diagnostic test was performed. In the event that a fault or potential fault is detected on a primary I/O adapter 120, operating system 132 identifies a primary I/O adapter 120 upon which diagnostic testing is to be performed (block 202). The identification can include reporting the identity to a system administrator via administrator console 136.

Once the primary I/O adapter 120 to be tested has been identified, the system administrator (via administrator console 136) and/or operating system 132 issues a fail over command, as depicted at block 203. In one embodiment, the fail over command is an ioctl (I/O control) command, supported by operating system 132 to allow user space code to communicate with hardware devices. The fail over command halts communication on the primary I/O adapter 120 that is to be subjected to diagnostic testing. In response to the fail over command, a fail over process is performed, as depicted at block 204 and as described in detail below with reference to FIG. 3. According to the fail over process, a redundant I/O adapter 120 is utilized during diagnostic testing of the primary I/O adapter 120 to support communication with a system resource in lieu of the primary I/O adapter 120.

Following block 204, the process proceeds to block 205, which illustrates the system administrator and/or operating system 132 performing diagnostic testing of the primary I/O adapter 120 identified at block 202 utilizing diagnostic code 138. As shown at block 206, during execution of diagnostic code 138, the system administrator and/or operating system 132 waits for diagnostic code 138 to complete. In response to detecting that diagnostic code 138 has completed, operating system 132 determines at block 207 whether or not the primary I/O adapter 120 has been diagnosed as faulty. If so, then operating system 132 and/or administrator console 136 presents a message at block 208 to inform a user that the primary I/O adapter 120 has failed. Thereafter, the process ends at block 211.

Figure 4:
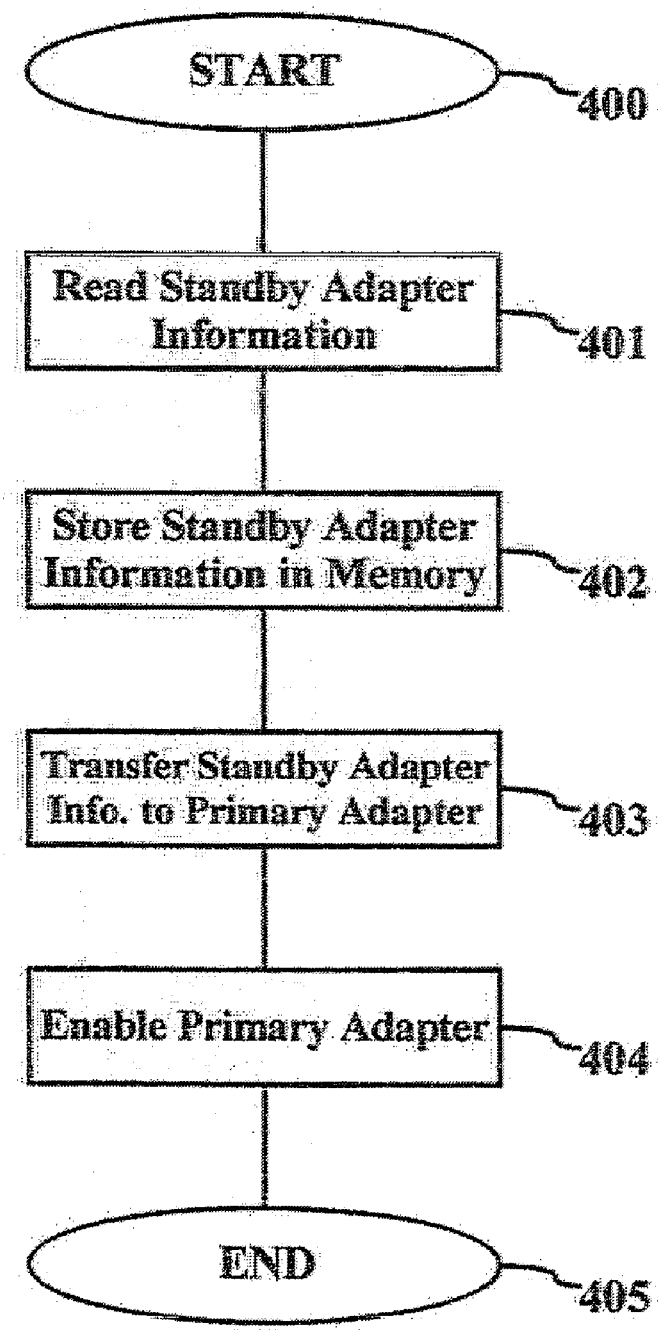
FIG. 4 is a high level logical flowchart of an exemplary fail back process for the data processing system of FIG. 1.

Alternatively, in response to diagnostic code 138 reporting at block 207 that the primary I/O adapter 120 is not faulty, operating system 132 and/or the system administrator issues a fail back command at block 209 to restore communication with the resource to the primary I/O adapter 120 as discussed further in connection with FIG. 4. As with the fail over command discussed above, in at least some embodiments, the fail back command may be an ioctl command supported by operating system 132. The process depicted in FIG. 2 thereafter terminates at block 211.

Figure 3:
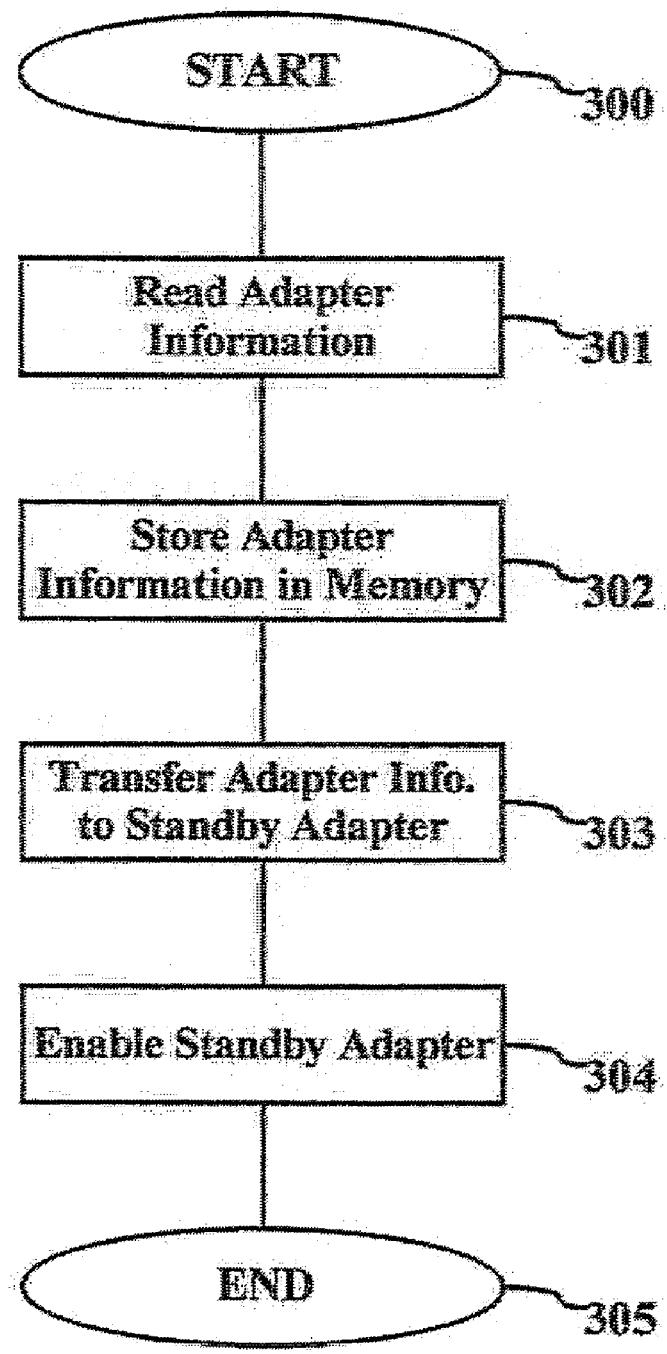
FIG. 3 is a high level logical flowchart of an exemplary fail over process for the data processing system of FIG. 1.

With reference now to FIG. 3, there is illustrated a high level logical flowchart of an exemplary fail over process, as depicted at block 204 of FIG. 2. The illustrated process transfers all the necessary state information from the primary I/O adapter 120 to a redundant I/O adapter 120 to maintain access to a system resource, such as network 150 or storage system 130, with little or no significant interruption.

The fail over process depicted in FIG. 3 starts at block 300 and the proceeds to block 301, which illustrates operating system 132 reading the state of the primary I/O adapter 120. The state may include not only information pertaining to primary I/O adapter 120 itself, but also communication currently being handled by primary I/O adapter 120. As shown at block 302, operating system 132 stores the state information read from primary I/O adapter 120, for example, in memory system 106. Next, at block 303, operating system 132 transfers all state information relevant to the continued performance of the resource access supported by primary I/O adapter 120 to an associated redundant I/O adapter 120. After the state information transfer, operating system 132 enables the redundant I/O adapter 120 at block 304 so that the redundant I/O adapter 120 performs the duties of the primary I/O adapter 120. During its operation, the redundant I/O adapter 120 is checkpointed at intervals by fault-tolerant data processing system 102 as previously described. The process depicted in FIG. 3 thereafter ends at block 305.

Referring now to FIG. 4, there is depicted a high level logical flowchart of an exemplary fail back process, as depicted at block 210 of FIG. 2. The illustrated process transfers all the necessary state information from the redundant I/O adapter 120 to a primary I/O adapter 120 to maintain access to a system resource, such as network 150 or storage system 130, with little or no significant interruption.

The fail back process depicted in FIG. 4 starts at block 400 and the proceeds to block 401, which illustrates operating system 132 reading the state of the in-service redundant I/O adapter 120. The state may include not only information pertaining to in-service redundant I/O adapter 120, but also communication currently being handled by the in-service redundant I/O adapter 120. As shown at block 402, operating system 132 stores the state information read from the in-service redundant I/O adapter 120, for example, in memory system 106. Next, at block 403, operating system 132 transfers all state information relevant to the continued performance of the resource access supported by in-service redundant I/O adapter 120 to a primary I/O adapter 120 for the system resource. After the state information transfer, operating system 132 enables the primary I/O adapter 120 at block 404 so that the primary I/O adapter 120 resumes its duties in supporting access to the system resource (e.g., network 150 or storage system 130). During its operation, the primary I/O adapter 120 is checkpointed at intervals by fault-tolerant data processing system 102 as previously described. The process depicted in FIG. 4 thereafter ends at block 405.

The present invention, as would be known to one of ordinary skill in the art could be produced in hardware or software, or in a combination of hardware and software. The system, or method, according to the inventive principles as disclosed in connection with the preferred embodiment and other embodiments, may be produced in a single computer system having separate elements or means for performing the individual functions or blocks described or claimed or one or more elements or means combining the performance of any of the functions or blocks disclosed or claimed, or may be arranged in a distributed computer system, interconnected by any suitable means as would be known by one of ordinary skill in the art.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a computer system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for fault tolerant operation and diagnosis of an I/O (Input/Output) adapter, said method comprising:
    assigning a primary I/O adapter and a redundant I/O adapter of a data processing system to support access to a system resource;
    thereafter, while a primary I/O adapter of a data processing system is in service in providing access to a system resource and a redundant I/O adapter of the data processing system is not in service in providing access to the system resource and in absence of an actual fault in the primary I/O adapter, issuing a fail over command to remove the primary I/O adapter from service and to place the redundant I/O adapter in service in supporting access to the system resource;
    in response to the fail over command, reading a state of the primary I/O adapter, transferring the state of the primary I/O adapter to the redundant I/O adapter, and enabling the redundant I/O adapter to assume support for access to the system resource;
    while the redundant I/O adapter is in service and the primary I/O adapter is not in service in providing access to the system resource, performing diagnostic testing on the primary I/O adapter;
    in response to the diagnostic testing revealing no fault in the primary I/O adapter, issuing a fail back command to restore the primary I/O adapter to service and to remove the redundant I/O adapter from service in supporting access to the system resource; and
    in response to the fail back command, reading a state of the redundant I/O adapter, transferring the state of the redundant I/O adapter to the primary I/O adapter, and enabling the primary I/O adapter to assume support for access to the system resource.

2. The method of claim 1, wherein issuing the fail over command comprises:
    issuing the fail over command in response to elapsing of an interval since a previous diagnostic test was performed on the primary I/O adapter.

3. A program product for fault tolerant operation and diagnosis of an I/O (Input/Output) adapter, said program product comprising:
    a non-transitory computer-readable storage medium; and
    program code within the non-transitory computer-readable storage medium and executable by a computer system to cause the computer system to perform:
        while a primary I/O adapter is in service in providing access to a system resource of a computer system and a redundant I/O adapter is not in service in providing access to the system resource and in absence of an actual fault in the primary I/O adapter, issuing a fail over command to remove the primary I/O adapter from service and to place the redundant I/O adapter in service in supporting access to the system resource;
        in response to the fail over command, reading a state of the primary I/O adapter, transferring the state of the primary I/O adapter to the redundant I/O adapter, and enabling the redundant I/O adapter to assume support for access to the system resource;
        while the redundant I/O adapter is in service and the primary I/O adapter is not in service in providing access to the system resource, performing diagnostic testing on the primary I/O adapter;
        in response to the diagnostic testing revealing no fault in the primary I/O adapter, issuing a fail back command to restore the primary I/O adapter to service and to remove the redundant I/O adapter from service in supporting access to the system resource; and
        in response to the fail back command, reading a state of the redundant I/O adapter, transferring the state of the redundant I/O adapter to the primary I/O adapter, and enabling the primary I/O adapter to assume support for access to the system resource.

4. The program product of claim 3, wherein the program code causes the computer system to issue the fail over command in response to elapsing of an interval since a previous diagnostic test was performed on the primary I/O adapter.

5. A fault-tolerant data processing system, comprising:
    processing resources;
    a system resource;
    a primary I/O adapter and a redundant I/O adapter assigned to support access to the system resource;
    a computer-readable storage medium coupled to the processing resources; and
    program code within the computer-readable storage medium and executable by the processing resources to cause the data processing system to perform:
        while the primary I/O adapter is in service in service in providing access to the system resource and the redundant I/O adapter is not in service in providing access to the system resource and in absence of an actual fault in the primary I/O adapter, issuing a fail over command to remove the primary I/O adapter from service and to place the redundant I/O adapter in service in supporting access to the system resource;
        in response to the fail over command, reading a state of the primary I/O adapter, transferring the state of the primary I/O adapter to the redundant I/O adapter, and enabling the redundant I/O adapter to assume support for access to the system resource;

while the redundant I/O adapter is in service and the primary I/O adapter is not in service in providing access to the system resource, performing diagnostic testing on the primary I/O adapter;

in response to the diagnostic testing revealing no fault in the primary I/O adapter, issuing a fail back command to restore the primary I/O adapter to service and to remove the redundant I/O adapter from service in supporting access to the system resource; and in response to the fail back command, reading a state of the redundant I/O adapter, transferring the state of the redundant I/O adapter to the primary I/O adapter, and enabling the primary I/O adapter to assume support for access to the system resource.

6. The fault-tolerant data processing system of claim 5, wherein the program code causes the data processing system to issue the fail over command in response to elapsing of an interval since a previous diagnostic test was performed on the primary I/O adapter.

* * * * *